(12) United States Patent
Cash

(10) Patent No.: US 11,563,269 B2
(45) Date of Patent: Jan. 24, 2023

(54) PHASED ARRAY ANTENNA AND APPARATUS INCORPORATING THE SAME

(71) Applicant: INTERNATIONAL ELECTRIC COMPANY LIMITED, Leominster (GB)

(72) Inventor: Ian James Cash, Derbyshire (GB)

(73) Assignee: INTERNATIONAL ELECTRIC COMPANY LIMITED, Leominster (GB)

(*) Notice: Subject to any disclaimer, the term of this patent is extended or adjusted under 35 U.S.C. 154(b) by 421 days.

(21) Appl. No.: 16/619,753

(22) PCT Filed: May 24, 2018

(86) PCT No.: PCT/GB2018/051421
§ 371 (c)(1),
(2) Date: Dec. 5, 2019

(87) PCT Pub. No.: WO2018/224803
PCT Pub. Date: Dec. 13, 2018

(65) Prior Publication Data
US 2020/0119444 A1  Apr. 16, 2020

(30) Foreign Application Priority Data
Jun. 5, 2017 (GB) ..................... 1708945

(51) Int. Cl.
*H01Q 3/26* (2006.01)
*B64G 1/44* (2006.01)
(Continued)

(52) U.S. Cl.
CPC ........... *H01Q 3/2617* (2013.01); *B64G 1/443* (2013.01); *H01Q 1/288* (2013.01); *H01Q 9/32* (2013.01); *H01Q 21/205* (2013.01)

(58) Field of Classification Search
CPC ...... H01Q 3/26; H01Q 3/2605; H01Q 3/2611; H01Q 3/2617; H01Q 21/20; H01Q 21/205
See application file for complete search history.

(56) References Cited

U.S. PATENT DOCUMENTS 5,940,048 A   8/1999  Martek
6,094,166 A   7/2000  Martek et al.
(Continued)

FOREIGN PATENT DOCUMENTS

WO   2007069809   6/2007
WO   2014086452   6/2014
(Continued)

OTHER PUBLICATIONS

International Search Report for International Patent Application No. PCT/GB2018/051421 dated Sep. 26, 2019; 6 pages.
(Continued)

*Primary Examiner* — Daniel Munoz
(74) *Attorney, Agent, or Firm* — James Pingor

(57) ABSTRACT

An electromagnetic phased array (100) is disclosed comprising a plurality of antenna elements (102), each antenna element (102) comprising at least three constituent antennae (104). A drive circuit (106) generates about an axis of each element (102) a radiation pattern that has a defined minima at or close to a null in at least one direction. The drive circuit (106) effects electronic steering of this minima through a range of angles around the axis of each antenna element (102) of the array (100) by appropriate setting of the vector currents associated with its constituent antennae (104). The axes of each of the antenna elements (102) are aligned in parallel with a central axis of the array (100) and at least a sub-set of the elements (102) lie substantially on a common helical surface. The elements (102) are spaced on this
(Continued)

surface such that the array (100) has a substantially constant aperture.

20 Claims, 11 Drawing Sheets

(51) Int. Cl.
*H01Q 1/28* (2006.01)
*H01Q 9/32* (2006.01)
*H01Q 21/20* (2006.01)

(56) References Cited

U.S. PATENT DOCUMENTS

| | | |
|---|---|---|
| 7,038,620 B1 | 5/2006 | Chubb, Jr. et al. |
| 2006/0119503 A1 | 6/2006 | Allen et al. |
| 2009/0229656 A1 | 9/2009 | Tillotson |
| 2010/0265146 A1 | 10/2010 | Montgomery et al. |
| 2017/0366208 A1* | 12/2017 | Filipovic .................. H01Q 9/32 |

FOREIGN PATENT DOCUMENTS

| | | |
|---|---|---|
| WO | 2015097130 | 7/2015 |
| WO | 2017015508 | 1/2017 |
| WO | 2017015605 | 1/2017 |
| WO | 2017027617 | 2/2017 |

OTHER PUBLICATIONS

Written Opinion of the International Searching Authority for International Patent Application No. PCT/GB2018/051421 dated Sep. 26, 2018; 12 pages.
Patents Act 1977: Search Report under Section 17(5) for GB Patent Application No. GB1708945.9 dated Nov. 6, 2017; 5 pages.

* cited by examiner

PHASED ARRAY ANTENNA AND APPARATUS INCORPORATING THE SAME

This application is a National Stage application of International Application No. PCT/GB2018/051421, filed on May 24, 2018 entitled "A PHASED ARRAY ANTENNA AND APPARATUS INCORPORATING THE SAME", which claims the benefit of G.B. Patent Application No. 1708945.9 entitled "A PHASED ARRAY ANTENNA AND APPARATUS INCORPORATING THE SAME" filed on Jun. 5, 2017, the entireties of which are incorporated by reference herein.

This invention relates to improvements in phased arrays. It also relates to an improved apparatus for transmitting power as a beam of radiation from one place to a distant target.

Phased arrays are well known in the art. A simple planar phased array comprises a set of antenna elements arranged in a common plane, each of which is associated with a phase shifting device. By suitable selection of the phase shift for each element, the antenna can be used to transmit a shaped beam of radiation when configured as a transmitter. By varying the phase shifts applied by each phase shifting device, the orientation of the beam can be steered, typically by ±45 degrees or so about a normal to the plane of the array, the so called boresight of the array. It may also be configured to operate in a receive mode with a directionality to the sensitivity of the receiver defined by the shape of the beam.

Phased arrays may be passive, with the same signal being applied to each phase shifter, or active, with a different signal applied to each phase shifter, e.g. one source of RF power split over all elements with adjustable phase between elements. Or they may be active with each element (or antennae comprising each element) having its own source of RF power.

This ability of a phased array to steer a beam can be useful in many applications, such as in RAdio Detection And Ranging (RADAR) system. In a typical application of a phased array, a strong and narrow beam can be transmitted out in one direction from the array and the return echo signal associated with the beam detected by the array or an adjacent array, followed by sending out similar narrow beams in other directions and detecting the echoes. The location of objects in the surrounding area can then be easily determined to produce a map of the location of objects in the surrounding area. This principle is used in military ships and airplanes to detect incoming hostile targets, but can also be used to detect clouds for weather prediction or in space to detect distant objects and is now commonly used in automotive applications, e.g. collision avoidance, fully autonomous vehicles, etc.

Other major applications for planar arrays are for communications.

It is envisaged also that phased arrays could be used as a mechanism for transmitting power from one point to another across space and/or through the atmosphere. Various speculative proposals have been made for the use of this principle in space where a phased array is connected to a solar-powered array and placed in an orbit around the Earth. The satellite converts received solar energy into electrical energy using the solar array, and this electrical energy is in turn used to produce a beam of energy that may be transmitted to the Earth.

To get the highest efficiency it is beneficial for such a satellite to have solar panels pointing continually at the Sun, whilst the steered beam remains in continuous contact with the Earth. To do this, the solar array and the beam must both be steered as the satellite travels along its orbit around the Earth. In a planar array the angle through which the beam can be steered is usually limited, characterised by reduced quality of the beam as the angle is increased away from the array's "boresight" direction. This results in either cosine losses as the solar array turns away from the Sun whilst the beam is kept in a fixed orientation, or results in an increased beam width (and, beyond ±45 degrees, significant components directed along the plane resulting in unacceptable beam degradation as the apparent transmit aperture is reduced due to attempts to steer the beam of a planar array off the boresight of the array).

One possible solution is to provide redundant solar panels or antennae that are oriented in different directions to the other solar panels or antennae and switching between panels and antennae as the satellite orbits the Earth. Adding redundant parts generally results in increased payload mass, a significant concern for those knowledgeable in the field of space launch.

An improvement in efficiency can be achieved by providing a mechanism that enables the solar array to move relative to the antenna so that each can be pointed in the optimum direction at all times. This could be achieved using a mechanical rotating joint or joints between the Sun-pointing and Earth-pointing parts of the satellite. A rotating joint is generally less reliable than a static structure. Should such a joint also need to pass more-than 10 s of kilowatts of electrical power, this presents a significant design challenge for the vacuum environment of space.

An object of the present invention is to provide a phased array that may be employed, amongst other uses, in such a satellite application and which ameliorates some of the problems inherent in these prior art proposals.

According to a first aspect the invention provides an electromagnetic phased array comprising a plurality of antenna elements, each antenna element comprising at least three constituent antennae; and a drive circuit, such that the vector sum of constituent antenna currents when in use generates about an axis of each element a radiation pattern or pattern of sensitivity to received radiation that has a defined minima at or close to a null in at least one direction, in which the drive circuit effects electronic steering of this minima of each respective pattern for each antenna element through a range of angles around the axis of each antenna element of the array by appropriate setting of the vector currents associated with its constituent antennae, further in which the axes of each of the antenna elements are aligned in parallel with a central axis of the array and in which at least a sub-set of the elements lie substantially on a common helical surface which is defined by twisting a rectangular vertical plane along the central axis of the array, the elements being spaced along this plane such that the array has a substantially constant aperture.

By "substantially on a helical surface", we mean the elements lie exactly on a common helical surface, or may be offset by only a small amount from the surface. This will occur, even when the elements are exactly on a common helical surface, if the array flexes during use. Since the invention can be used to produce very large arrays, it is likely that in practice this flexing will occur causing relative movement between the elements.

The helical surface may rotate through approximately 180 degrees, or a multiple of, from one end of the array to the opposing end, with elements being located along the surface from one end to the other.

All of the elements of the array may lie on the common helical surface.

In a simple arrangement, the elements can be arranged in multiple sets, each set containing a subset of the total number of elements, the elements of each set being arranged in a plane that is orthogonal to the axis of the array and the planes spaced apart along the axis of the array.

The elements in each plane may be arranged in a row, with the rows in adjacent planes being angularly offset so that the elements lie on the twisted helical surface. Each element must lie on the helical plane (or on one of the two or more helical planes, where provided).

Where the elements of each set are in offset rows in the above manner, the helical surface can be achieved by arranging for the rows in two adjacent planes to be rotated about the axis of the array.

Each set may contain the same number of elements.

It is most preferred that the helical surface twists through an integer multiple of approximately 180 degrees, for example 180 degrees or 360 degrees.

The applicant has appreciated that, as a consequence of these elements each having a steerable null, the arrangement of such elements into a helical surface having constant aperture from any azimuth angle, and the suitable control of relative phase between elements by the drive circuit, the phased array of the invention in a preferred configuration is able to form and steer a single tightly focused beam pattern through 360 degrees azimuth—with near-invariant beam width, peak intensity and symmetrical side-lobes. The beam may also be steered in elevation, typically ±55 degrees (3 dB limit).

By azimuth, we mean the angle in the XY-plane when the axis of the phased array is considered to extend in the Z-direction in which the beam is directed.

In use, the Z-axis of the array may be arranged vertically so the XY-plane is horizontal. The reader will, of course, understand that reference to "vertical" and "horizontal" are merely mentioned as a convenience to use the widely used polar co-ordinates "azimuth" (angle about vertical axis) and "elevation" (angle above/below horizontal). In practice, the Z-axis does not need to be vertical, and indeed if the phased array is used in deep space, the concept of vertical/horizontal is of course effectively meaningless.

Each of the antennae may be substantially, or perfectly, omni-directional. Each may therefore have a near-uniform radiation pattern in all directions about one plane.

Each of the antennae for an element may comprise a dipole or a folded dipole, or other similar omni-directional antenna types known to those familiar with the art, resonant at the centre wavelength, Each antenna element may have an axis that is parallel to the axis of the array, and as such parallel to the axis of each antenna element.

In a preferred arrangement, each of the elements of the array may comprise a triangular arrangement of three parallel dipoles, spaced one-quarter wavelength apart from each other.

The drive circuit may be arranged to electronically steer the radiation pattern for each antenna element through a range up to a complete 360 degrees, either through a discrete set of angles or infinitely adjustable to any chosen angle within the range.

The applicant has proposed a phased array which, in at least one configuration, provides an improvement over a planar array in terms of increased beam steering angle, for instance up to 360 degrees versus 90 degrees for a typical planar array for only π/2 increase in number of elements, or, equivalently, π/2 increase in substrate area (for identical element density) where each element now consists of three constituent antennae.

The drive circuit may be configured to set the vector currents at each constituent antenna to provide the steerable null capability for the element.

The constituent antennae of each element may be oriented spatially such that the drive circuit, by applying appropriate vector currents at each constituent antenna, produces a pattern for each element that has a steerable minima which may comprise a null being the extreme limit of the minima of the pattern.

The pattern of radiation, or pattern of sensitivity, for each element, may comprise a cardioid-shaped pattern or any suitable pattern that provides a steerable null.

The drive circuit may be configured to drive the elements with appropriate phase to steer the beam. The drive circuit may steer the beam through 360 degrees in azimuth (i.e. about the Z-axis of the array) and may steer the beam in elevation by up to about ±55 degrees with the peak intensity corresponding to the elevation pattern of its constituent antennae, e.g. a 3 dB steering limit of ±55 degrees—as for a half-wave dipole pattern.

The phased array may be configured to emit narrow-band radiation or receive narrow-band radiation, or be configured to do both at a wavelength, in a range from sub-metre, by which we mean >300 MHz, down to sub-centimetre, by which we mean <300 GHz parts of the electromagnetic spectrum, or even at sub-millimetre scales.

The drive circuit may comprise, for each element, a local oscillator that is phase-locked to a system-wide reference frequency source and a digitally-controlled phase offset with respect to a system-wide synchronised timing reference source.

The drive circuit may comprise a separate digitally-controlled phase offset for each constituent antenna of each element, although an analogue solution may be implemented, for example the use of analogue phase shifters comprising varicap diodes inserted into a transmission line to provide a phase delay.

The drive circuit may be configured to select a phase shift for each element according to the relative position of the antenna in the array to at least one other element in the array or relative to a fixed datum such as the common axis.

However, it is preferable to determine the phase by providing, for each element or spatially fixed subset of element, a means for receiving or generating a system-wide synchronised timing reference and means for sampling the spherical wavefront of an incoming pilot beam (i.e. retrodirective beam steering). This way, the array can be relatively flexible whilst still allowing a coherent beam to be produced.

The apparatus may include a signal-encoding circuit which modulates the RF source applied to one or more, and preferably to each element, to encode a signal into the beam generated by the phased array. This allows a remotely located receiver to extract the information encoded into the beam, enabling the phased array to be used to transmit information.

The spacing between adjacent elements is preferably less than or equal to one half of the wavelength of the signal that is applied to or received by the elements. The applicant has appreciated that this spacing prevents grating lobes.

The phased array may comprise a substrate which provides mechanical mounting and electrical interconnection for the antennae of each element of the array. In a most preferred arrangement, the substrate that supports each of the elements may comprise a printed circuit board (PCB) substrate, e.g. a flexible-rigid multilayer PTFE/polyimide with copper interconnect.

The drive circuit may comprise an integrated circuit controlling n elements, where n may be one or more. More than one integrated circuit may be mounted on the same high frequency substrate, such as a multilayer laminate of polyimide, PTFE and conductive copper interconnect.

The number of elements in the array can be chosen to suit a particular application. For example, the array may comprise a 16×25 element array with 25 planes containing each a set of 16.

For suitable use of the phased array to beam power across a large distance, the phased array may be relatively massive, of the order of tens of metres in the X-, Y- and Z-directions. The array may be 34 m across in the X-, Y- and Z-directions if located 20 km above the Earth in the stratosphere. From GSO (36,000 km), typically the array may have an X, Y, Z dimension of 1 km to 1.5 km across—taking account of the fundamental diffraction limit and setting an ideal/safe 230 W/m^2 ground peak intensity. For example, a phased array according to the invention for power beaming across 20+ kilometers to a target may have a length/diameter of ~34 metres for a 74 metre rectenna (beam spot) diameter at the target.

The diffraction limit formula is (Dtx*Drx/$\lambda$*P)≥2.44, where D's are diameters, P is total path. Hence such power beaming at 5.8 GHz may require at-least 1300 by 2100 elements. For lower distances, or larger targets (or higher frequencies, suffering atmospheric absorption above ~10 GHz), fewer elements can be used.

The minimum practical array may comprise a 3×5 array of elements, i.e. 5 planes or layers of 3 elements spaced $\lambda$/2 apart (where $\lambda$=wavelength).

Each successive row in the array, where the elements are arranged in a series of rows in spaced parallel planes, may be offset angularly from the adjacent row by between 36° (where 5×36°=180°) and (at most) 0.393 giving a separation of $\lambda$/2 between end elements on adjacent rows. Note that the top/bottom rows are not parallel.

Having maximum diameter, D, of $\lambda$ and height, E, of 1.572$\lambda$(measured between element centres), its cross-sectional area is approximated by the sinusoidal area: 2·D·E/$\pi$.

For embodiments larger than the wavelength scale, mechanical rigidity may be improved by splitting each row into a number of zig-zag segments, the substrate supporting each of the zig-zag segments.

Each linear array in such a configuration may have 5 segments, with a regular spacing ($\lambda$/2) of four elements along each segment (one element being common at each of the 4 node junctions) and a segment deviation angle of 60 degrees.

The angular deviations adjust the total linear extent by a factor of $\sqrt{3}/2$ (from 7.5$\lambda$ to approximately 6.5$\lambda$).

For even larger embodiments, each of the sub-rows of elements in the zig-zag arrangement of elements may be further subdivided in a fractal manner i.e. zig-zags containing zig-zags at a smaller scale, providing increased self-rigidity across multiple scale magnitudes.

The elements of the array may be supported by a plurality of substrates, each substrate supporting at least one element, the substrates being connected by a network of linkages that define the relative positions of the substrates. Each substrate may comprise a rigid board such as a printed circuit board or flexible circuit stiffened by other means such as elongate carbon fibre elements.

The network of linkages may include a plurality of joints that enable the array to be folded and unfolded. This is especially suitable where the array is to be placed in an orbit around the Earth as it could be launched into space in the folded form before being deployed once in orbit.

Each substrate may lie in a horizontal plane orthogonal to the common axis of the array, the linkages connecting the substrates together.

In a yet further preferred arrangement, the substrates and the elements they carry may be joined to neighbouring (Z-offset) substrates by a multitude of struts and pivot joints, such that the action of folding (as described above) in each local X-Y plane, results in a reduction in both angular and linear offset between adjacent sub-arrays about and along the Z axis—leading to a highly compact (in 3 dimensions) stowed form.

The arrangement of linkages and joints in alternating layers of the helical array may be the same, with the arrangement of struts in adjacent layers different. The whole support structure may therefore include two arrangements of struts.

One or more spring may be provided at the hinge joints that connect a segment to another segment, the springs being arranged to apply a force to the segments when in the folded condition that will cause the structure to unfold automatically when released.

The structure may include a releasable lock mechanism that when locked holds the structure in the folded position and when unlocked allows it to unfold. When combined with springs the array structure may be made self-deploying from its compact (2D or 3D) folded configuration, by the release of the lock mechanism.

The lock mechanism may comprise one or more pins that engage in respective recesses in the structure to prevent unfolding and which can be pushed or pulled from the recesses to unlocked. Alternatively the pins may be frangible and the lock mechanism unlocked by breaking the pins.

According to a second aspect the invention provides a power beaming apparatus for harvesting solar energy from the Sun and transmitting energy to a remote location such as the Earth comprising:

a phased antenna array according to the first aspect; and
an integrated solar array comprising a multitude of photovoltaic devices and associated concentrating optics electrically connected to the phased antenna array,
the solar array outputting electrical power that is used to supply drive the elements of the array to produce a beam of energy that is steered by the drive circuit towards the remote location.

The integrated solar array and associated concentrating optics may be physically dispersed throughout the phased antenna array, with each element or a subset of elements being located proximal one or more associated photovoltaic devices. The antenna elements, associated photovoltaic devices, and optics may be supported by a common substrate. Such an interspersed solar array may intercept an equal area of solar rays as the constant aperture of the antenna phased array, but from one preferred orientation only.

Alternatively, although not as elegant in concept, they may be located in a separate configuration that is fixed to the phased antenna array.

The remote location may comprise a fixed point on the Earth, or a fixed point on a moving object such as a boat, or plane, or a satellite, or may be any point in space that can be tracked by the beaming apparatus to enable the drive circuit to steer the beam towards that location.

The number of elements in the array, the power transmitted by each element, and the amount of energy that may be collected from the Sun by the solar array, may be chosen to enable a beam of sufficient power to be fed into the national electricity grid, or to support smaller off-grid applications such as a forward military base.

The relative orientation of the solar array and the phased antenna array may be fixed, so no moving joints are needed between the solar array and phased antenna array.

The positioning device may include a solar tracker that determines the orientation of the Sun relative to the power beaming apparatus and positions the solar array in a most optimal angle relative to the Sun to maximise the efficiency of the solar panel. For instance, in all orbital configurations, the satellite may rotate once per year about its own axis to point the solar array at the Sun once per year if orbiting Earth, or located at other 1AU Lagrange point. The apparatus may also be made somewhat self-orienting with respect to the Sun, using photon pressure to correct for small perturbations.

The apparatus may include non-imaging dielectric optics that concentrate sunlight through an angle of typically 90 degrees onto the photovoltaic devices of the array. An example of a suitable dielectric optic is a Fresnel lens, arranged in combination with a planar dielectric reflector and a secondary Kohler concentrator to direct sunlight onto the photovoltaic devices, giving high concentration with small acceptance angle. An example of such an arrangement is taught in US 2010/0123954 which is incorporated herein by reference.

In an alternative arrangement, flexible line-focus dielectric parabolic reflectors may be arranged in a Compound Parabolic Concentrator configuration, giving lower concentration but wider acceptance angle, as taught in U.S. Pat. No. 5,523,862 again incorporated herein by reference.

The power beaming apparatus may comprise a part of a satellite that is, in use, suitable for placing in an orbit around the Earth or any other flight path in space, for instance an orbit around the Moon or another planet.

The power beaming apparatus may comprise a positioning device which controls the orientation of the solar array relative to the Sun, in particular to control the attitude of the power beaming apparatus in a space application. As mentioned above, photon pressure could be used as a passive steering mechanism.

According to a third aspect the invention provides, instead of a power beaming apparatus, an apparatus for beaming a signal encoding information, having all of the features of the second aspect apart from the alternative feature that the transmitted signal encodes information rather than simply transmits power.

The apparatus may include a transponder that receives a signal from the Earth or some other distant location that contains information, and converts this into a signal that modulates the RF waveform that is applied to the elements of the phased array. The transponder may detect incoming radio frequency signals encoding the information. As such the apparatus may be configured to provide 2-way communications.

In the case where the aim is to transmit information rather than large amounts of solar power, the solar energy from the solar array may be used to provide the sole source of power for the beam forming array.

For example, a photovoltaic element PV may be mounted on one side of the substrate that supports an antenna element, with a planar dielectric mirror transparent to microwaves set at 45 degrees to the X-Y plane reflecting non-concentrated sunlight through 90 degrees onto the PV element.

Dielectric mirrors comprising reflectors and Fresnel lenses can be used which are transparent to the RF beam, and the PV element may be oriented flat on the substrate ground plane near the midpoints of the 3 constituent antenna of each element so that they do not interfere with the beam.

According to a fourth aspect the invention provides a method of use of the apparatus of the second aspect or the third aspect of the invention comprising the steps of:
  placing the apparatus into an orbit where the solar array is facing the Sun with the phased array located with a clear line of sight of the Earth, and
  steering the beam of phased array to direct a beam onto a fixed target.

Placing the apparatus in orbit may enable the more efficient collection of energy from the Sun, as the solar array is outside of the Earth atmosphere and can be placed in an orbit where it is always in sight of the Sun, which in space is non-diffuse, allowing high concentration optics and highest efficiency PV. In turn, by transmitting the energy to the Earth with a wavelength $\lambda$ above 3 cm (<10 GHz) the atmosphere does not affect the transmitted signal (typically <2% loss through severe precipitation) as much as it does the sunlight so efficiency of collection can be higher.

The method may comprise placing the apparatus into an orbit around an at-least asteroid-mass object carrying the target, the object typically being the Earth. The phased array of the invention can be used in any suitable orbit but the generally recognised "best" is a geosynchronous (includes geostationary) orbit.

The method may comprise providing multiple apparatus, each in a different Sun-synchronous orbit, each directing a beam to the same target in-turn as they each satisfy diffraction and surface receiver elevation limits. This may allow multiple, smaller, satellites, to be used to give a similar utilisation rate at the rectenna to one satellite on a geostationary orbit.

For example, the applicant has appreciated that 5 (much smaller) satellites can give >97% utilisation at the (northern latitude) rectenna when in a 3 hour Sun-synchronous inclined elliptical orbit. Other circular Sun-synchronous orbits at 2 hrs and 2 hrs 24 could be used to allow even smaller satellites.

The target may comprise a fixed position on or above the Earth.

Alternatively the method may comprise fitting the apparatus to a super-pressure balloon or other airborne device such as a stratospheric dirigible/blimp and deploying the airborne device in a fixed location of flight patterns and steering the beam to a fixed position.

The method may comprise providing a receiver at the fixed location. This may comprise a Rectifying Antenna—"rectenna". In this respect the invention in another aspect may comprise a system incorporating the apparatus of the second aspect or third aspects and a rectenna.

The method may comprise providing a receiver at the target that also outputs a low power pilot beam that is directed to the apparatus in order to effect retro-directive beam steer, helping the apparatus to send the beam of energy towards it.

This enables the apparatus to sample the spherical wavefront produced by the pilot beam transmitter at a regular system-wide reference instant and, by time reversal of the sampled phases applied to the elements, and by calculation of the target azimuth angle from these phase samples applied to steer the null pattern at each element directly away from the target, the apparatus is able to produce a similar coherent spherical wavefront centred on the target rectenna, with the power beam directed there. Note the pilot beam need not be at the same wavelength as the power beam.

The method may permit the efficient wireless power transfer through kilometers of atmosphere, where absorption due to moisture limits the wavelength of the beamed signal, to >3 cm (<10 GHz). A specific aspect of embodiment is for λ around 5 cm, utilizing the 5.8 GHz international ISM band.

There will now be described, by way of example only, several embodiments of the invention with reference to the accompanying drawings of which:

FIG. 1 shows the layout of the elements in a first embodiment of a phased array according to an aspect of the invention, FIG. 2 shows the layout of the elements in a second, larger, embodiment of a phased array according to an aspect of the invention, FIG. 3 illustrates schematically the relationship between the drive circuit and the elements of the array;

FIG. 4(a) to (d) show four cardioid patterns that can be generated by each element of the arrays of FIGS. 1 to 3;

FIG. 5 compares the polar radiation pattern of two 7×11 element transmitting phased arrays giving a direct comparison between an embodiment of the invention and an equivalent simple (no rear reflector) planar array, both with the same physical area, same number of elements, same total RF power;

FIG. 6 is similar to FIG. 5 but on a logarithmic scale showing intensity, i.e. power density, against angle;

FIG. 7(a) to (d) shows an exemplary support structure that can be folded and unfolded;

Figure 1:
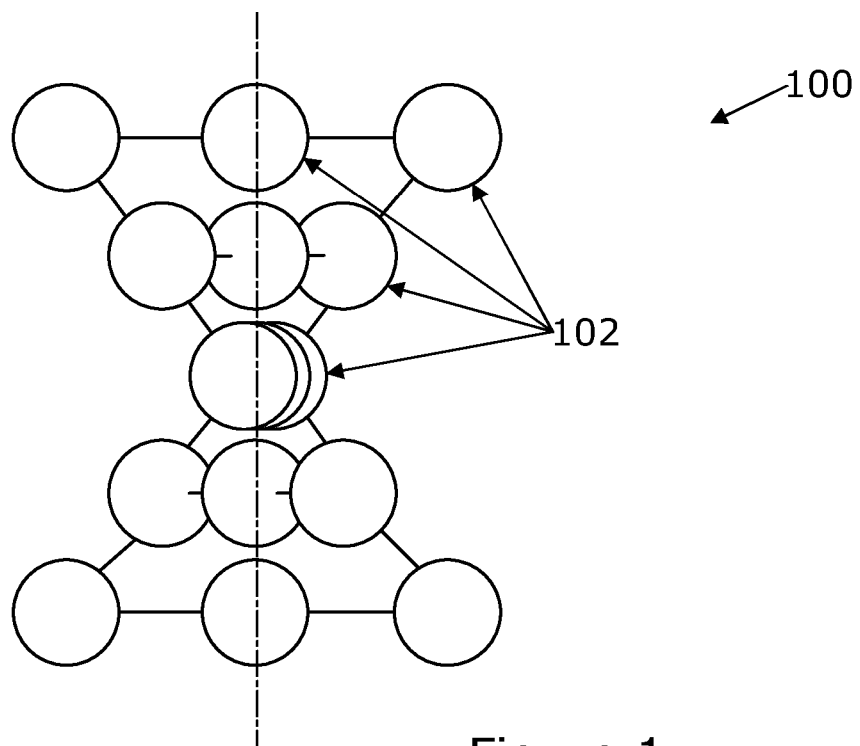

As shown in FIG. 1, an embodiment of a phased antenna array 100 within the scope of an aspect of the invention comprising a plurality of antenna elements 102. As shown there are 15 elements 102, arranged as five rows of three elements. Each antenna element 102 comprises three antennae, which in this example are omni-directional dipoles 104. The axes of each dipole 104 of the antenna elements 102 are aligned in parallel with a common central axis of the array 100 and spatially located such that the array 100 has a substantially constant aperture when viewed about that axis. In FIG. 1 the common axis is vertical and runs top to bottom along the page indicated by a dotted-dashed line.

The elements are arranged such that they all lie on a common helical surface which can be described by twisting a rectangular vertical plane through 180 degrees from bottom edge to top edge, the bottom and top edges being spaced along the axis of the array.

As shown the elements 102 are divided into sets, each set of elements being arranged in a row in a horizontal plane which is offset from adjacent sets along the axis of the array, e.g. from top to bottom along the page as shown. The orientation of the row within the respective plane rotates from one row to the next along the array 100.

As shown the rows are offset angularly from the adjacent row by 36° so that the helical surface has twisted through approximately one half turn, 180°, from top to bottom (the top and bottom most rows are also offset by 36°).

Figure 2:
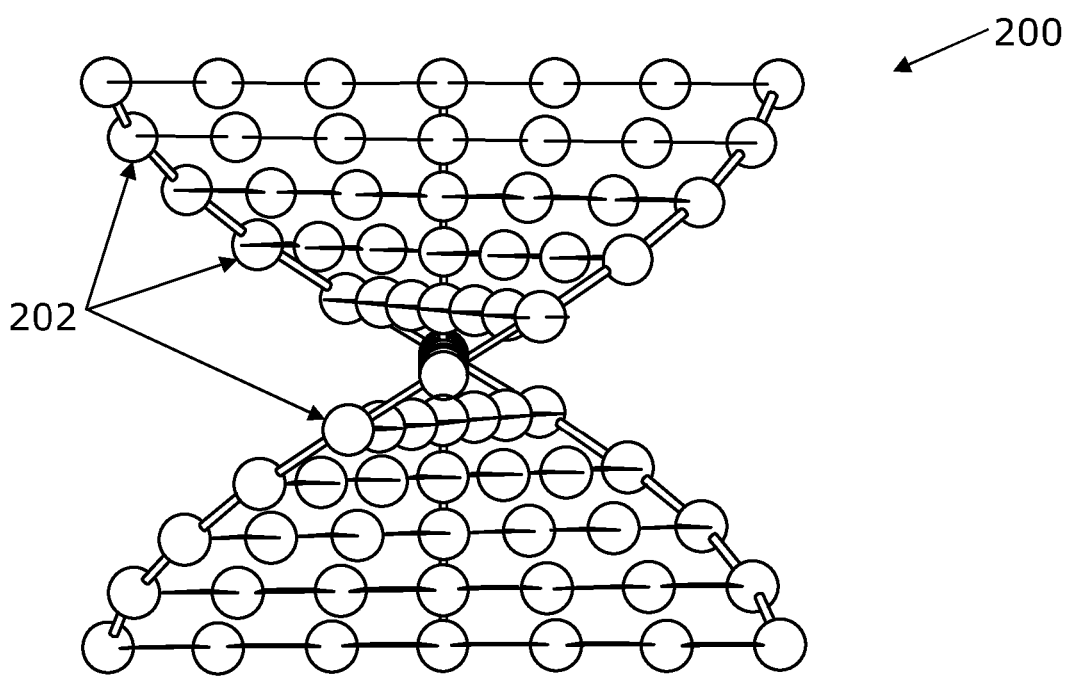

Other, larger, arrays can of course be provided. FIG. 2 shows an arrangement of an array 200 with 7×11 elements 202. In this case, the angular offset of each adjacent row is smaller to provide the same near-180 degree rotation of the helical surface.

Figure 3:
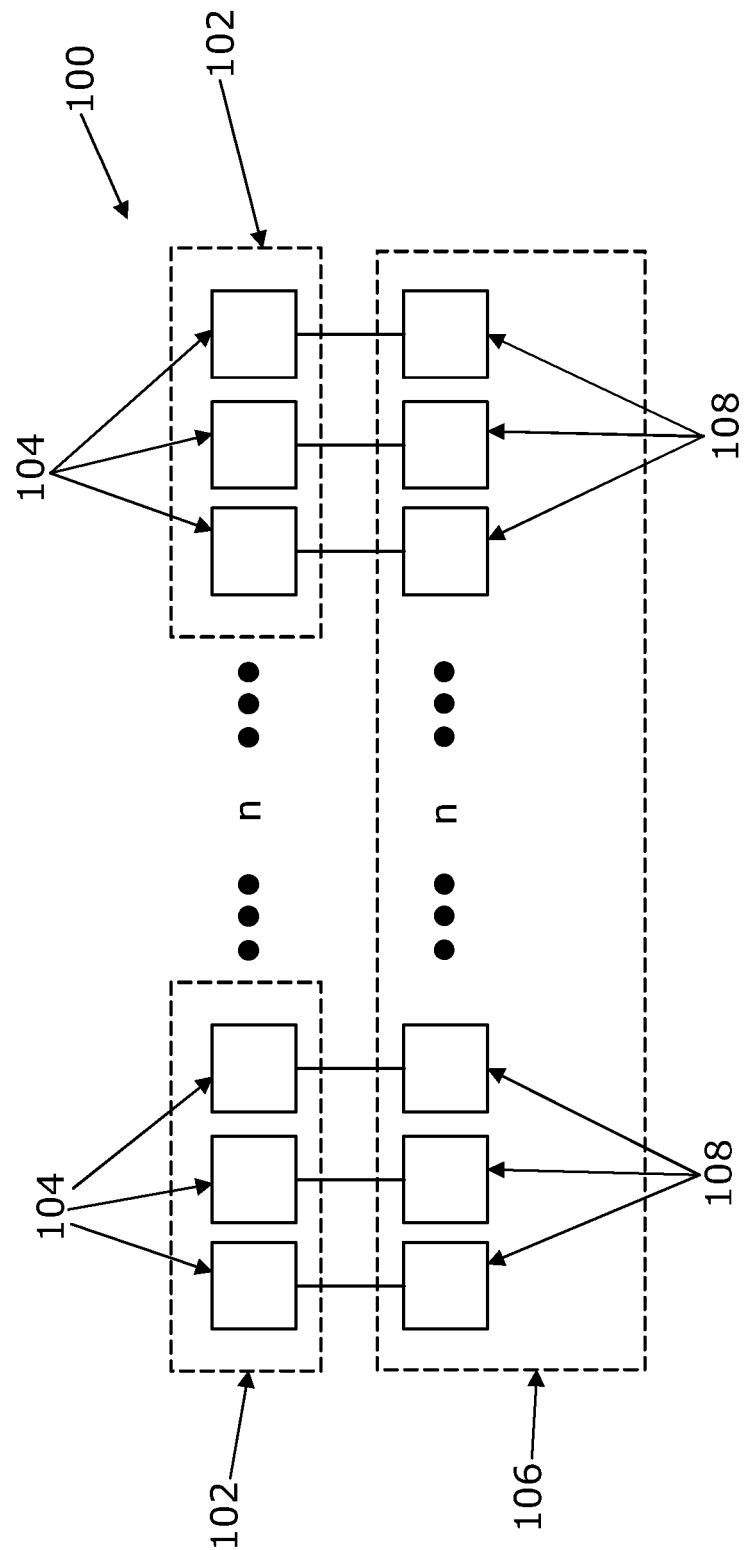

As shown in FIG. 3, the phase array 100 of FIG. 1 (scalable to any other size array) includes a drive circuit 106, whereby each dipole 104 is associated with a phase shifter 108 which forms a part of the drive circuit 106 which shifts the phase of any RF source signal applied to the elements 102 of the array. The phase shift that can be applied for each dipole 104 is electronically controlled.

The drive circuit 106 electronically steers the respective pattern for each antenna element 102 through a full range of 360 degrees about the vertical axis of the array 100 by appropriate setting of the relative phase and magnitude of its constituent dipoles 104. In effect, the drive circuit 106 causes each element 102 to generate a cardioid pattern for which the null can be rotated through 360 degrees. By changing the direction of the nulls for all elements 102 the beam produced by the array 100 can be steered through 360 degrees about the axis of the array 100.

Figure 4:
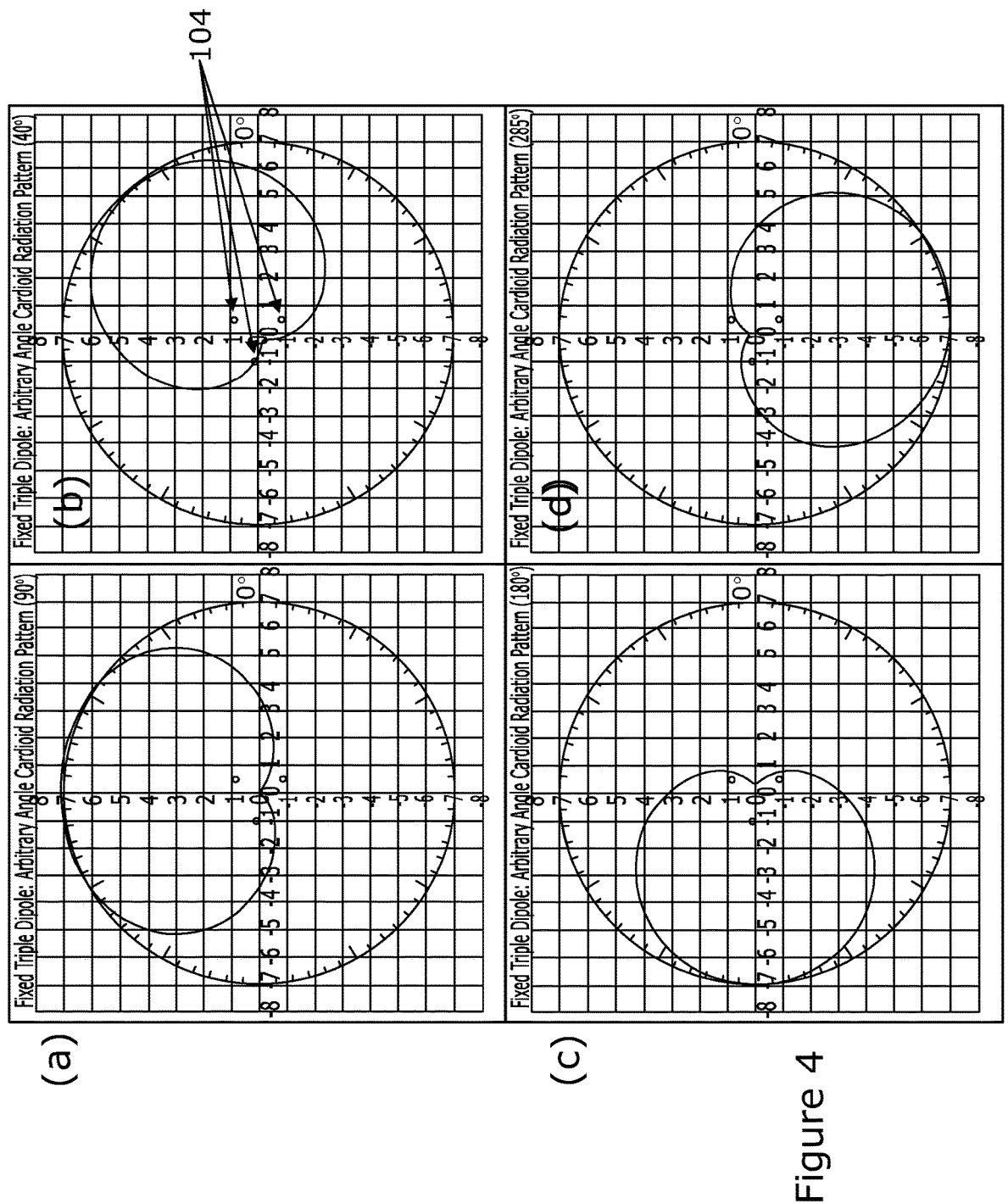

FIG. 4 shows some of the patterns that can be generated by each element of the phased array 100, as viewed from above looking vertically down the axis of the array 100 which may be considered to lie on the Z axis in a Cartesian XYX coordinate frame of reference. The location of the three dipoles 104 at the corners of an equilateral triangle centred on a centre point of the element can be seen in the figure. These patterns can be achieved using the following. The relative amplitude for dipole nd (nd=1, 2, 3) is set by the drive circuit 106 according to the cosine of the azimuth angle T-C-Dnd, where T is the target, C is the centroid of the element, and Dnd is the dipole. The phase for dipole Dnd is set by the drive circuit 106 as $-2\pi$ multiplied by the wavelength-modulus distance T-Dnd. This can be applied to perfect omni-directional antenna, or with small modifications can be applied to antennae that are not perfectly omni-directional.

By controlling the phase of each element 102, whilst keeping the same pattern for each element 102, the whole array 100 can produce a tight beam that can be steered through 360 degrees about its axis. It can also be steered in elevation by around 55 degrees above and below horizontal, the limit being defined as the point at which the peak intensity has dropped off by around 3 dB.

Figure 5:
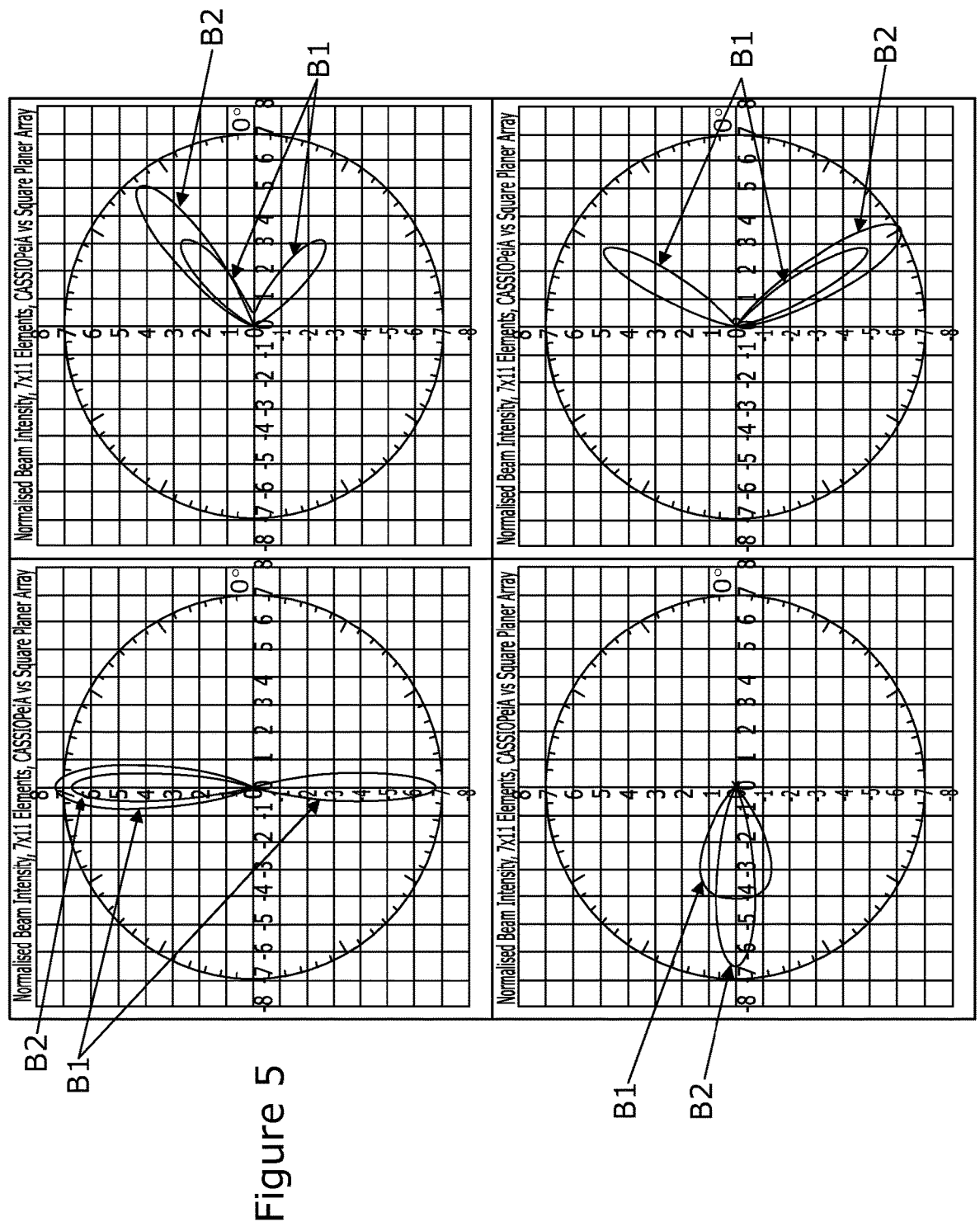

FIG. 5 compares the polar radiation pattern of two 7×11 element transmitting phased arrays with identical element power, row spacing (along the Z-axis, centred on the X-Y plane) and element spacing along each row. The relative phasing of all elements are optimally chosen to direct the beam pattern to a distant point on the X-Y plane.

The first phased array is a prior art planar array that comprises simple dipole elements (Z-axis aligned) in a flat arrangement in the X-Z plane, without the (normally present) reflector/absorber to select the desired Y half-plane.

The second phased array is the helical configuration as described in the previous Figures.

The planar array has a "boresight" direction along the Y-axis. The peak beam intensity attenuates as the beam sweeps away from the boresight direction. Beyond ±45 degrees (with respect to the boresight), a significant component of the beam B1 is directed along the X-Z plane.

By comparison, the helical arrangement of the array of the present invention has no boresight direction; there is minimal change in peak amplitude nor half-power beam width as the single lobe B2 rotates continuously through 360 degrees about the Z-axis.

Figure 6:
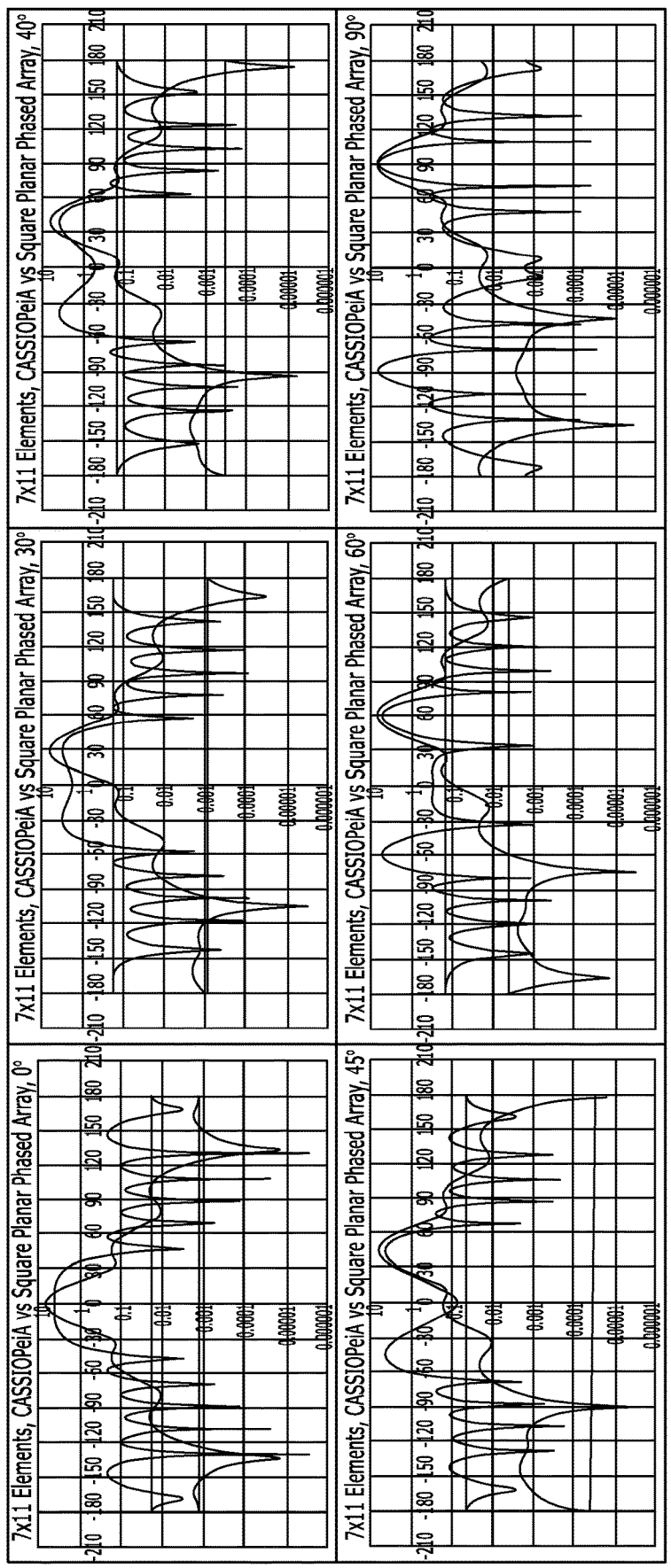

FIG. 6 shows the same planar array vs the array of FIG. 2 (helical configuration), this time as a logarithmic plot of intensity vs angle. In contrast to a planar array, the side-lobes remain consistent and symmetrical about the primary lobe, as the beam rotates about the Z axis.

The examples shown in FIGS. 1, 2 and 3 each have fixed elements that do not move relative to each other, but it is within the scope of an aspect of the invention for the elements to be supported by a structure which can be folded and unfolded to reduce the volume of the array when it is not being used.

Figure 7:
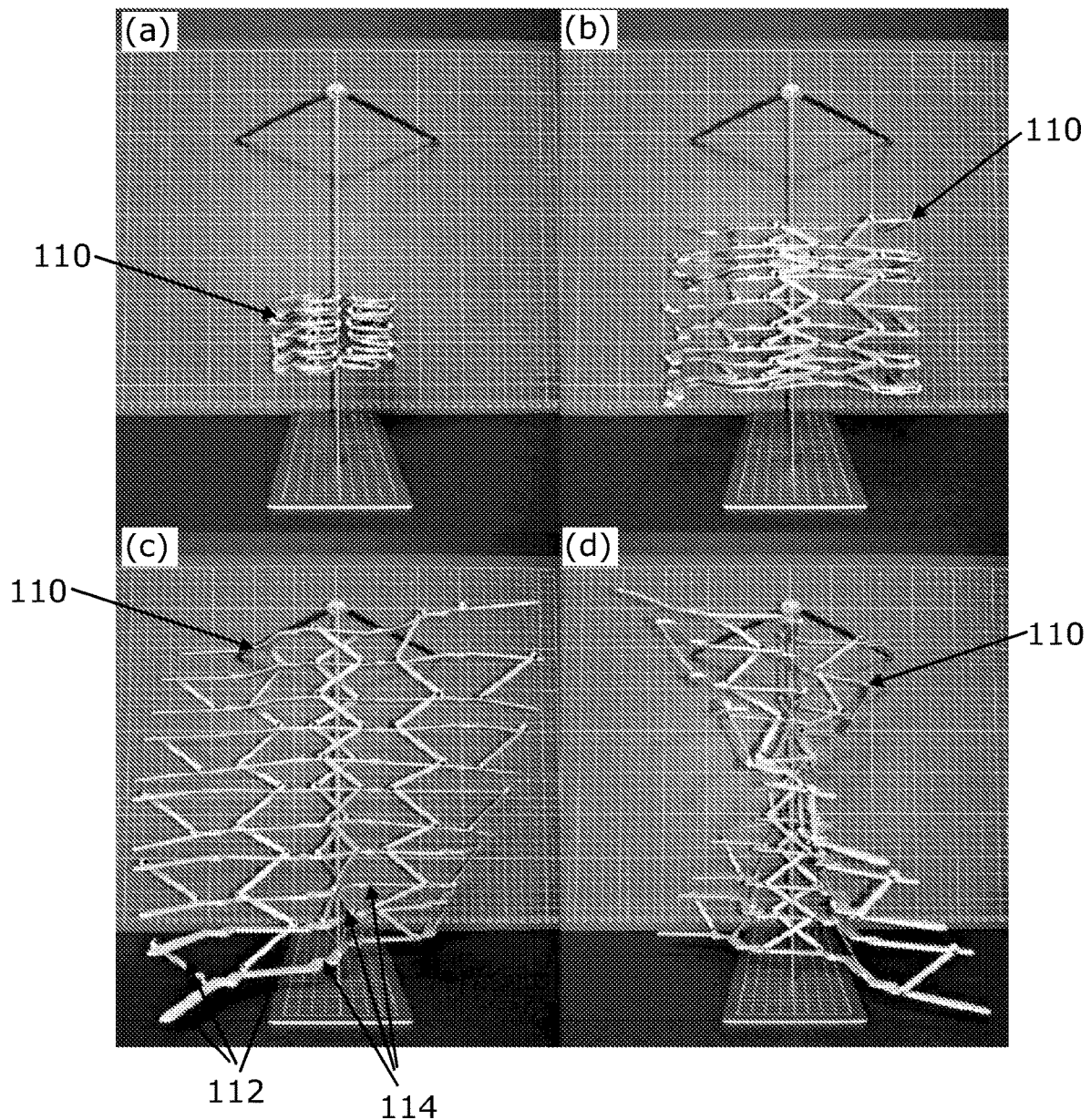

FIG. 7 shows an exemplary support structure 110 within the scope of an aspect of the present invention. The structure 110 is shown in varying degrees of expansion, from a compressed state in FIG. 7(a) to a fully expanded state in FIG. 7(d). The structure 110 comprises substrates 112 located in each horizontal plane of the array that each support a small subset of the total set of elements. These are connected together across the planes by a network of linkages 112 and hinged joints 114.

The linkages 112 and joints 114 can move to allow the whole array 100 to move from a collapsed form shown in FIG. 7(a) to a fully expanded form in FIG. 7(d).

A notable feature of the arrangement of the elements in the above examples is that the cross sectional area, or aperture, of the array remains substantially constant for all viewing angles of the array around the vertical axis. This means that the array can be rotated about that axis and, when viewed from a distant object perpendicular to the axis, the power that can be transmitted in the beam that reaches the object will remain substantially constant.

A scaled-up array based on the embodiment of FIG. 7, having many more elements, may therefore conveniently be used to transmit a high power beam of radiation to a distant target, which may be from tens of metres to tens of kilometers away or at about 36,000 kilometers, i.e. GSO altitude.

This constant power feature and ability to steer the beam through 360 degrees makes the array especially suited to being placed in an orbit around the Earth and transmitting power back to a target on the Earth. This may be combined with the solar panel array to collect the Sun's energy and transmit it back to the Earth where it can be used to power electrical devices, homes, vehicles and so on.

Figure 8:
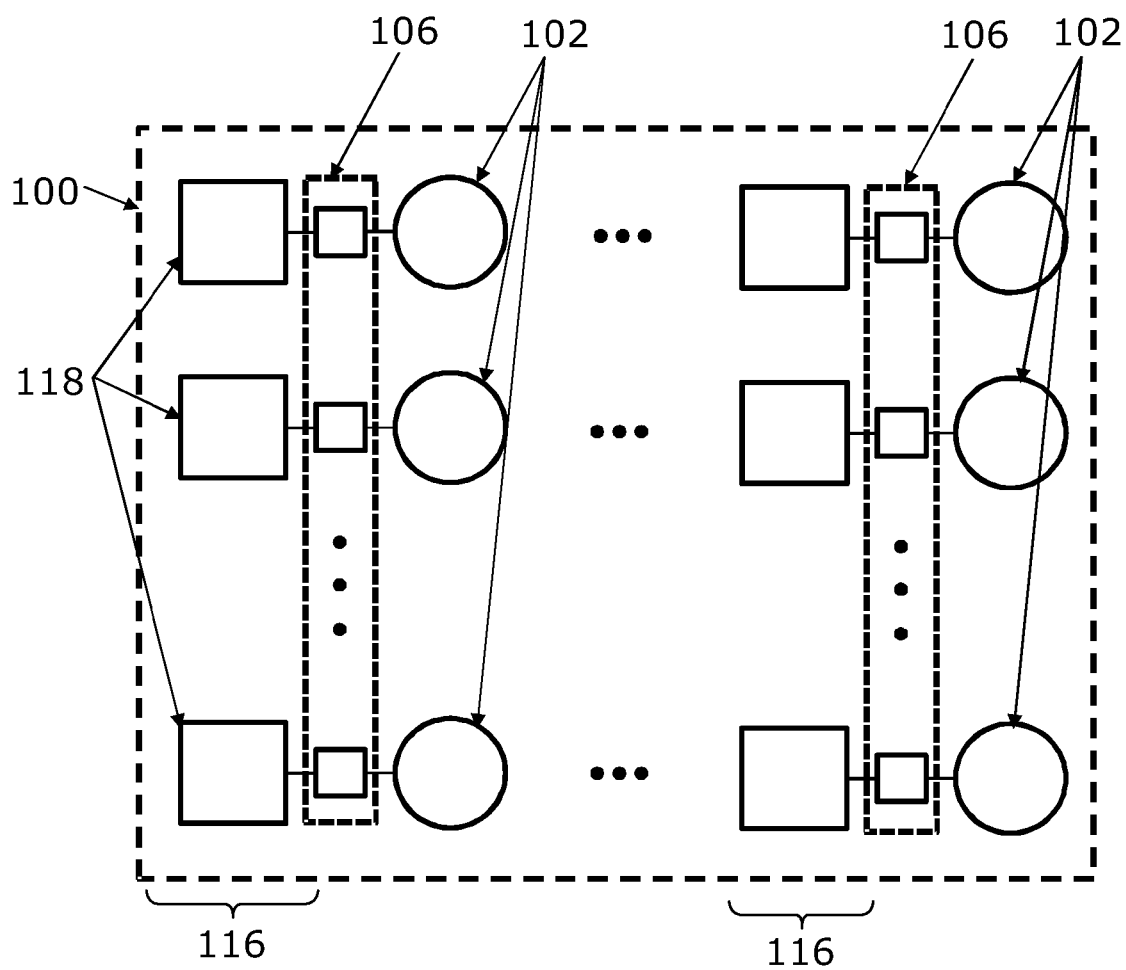
FIG. 8 is a schematic representation of a power beaming apparatus combining a phased array and a solar array.

FIG. 8 shows an arrangement in which a solar array 116 is integrated with the phased antenna array 100. The solar array 116 comprises a multitude of photovoltaic devices (PV) 118 electrically connected to the phased antenna array 100. In this example, the photovoltaic devices 118 are physically interspersed amongst the elements 102, with one PV 118 (or group of PV elements) for each antenna element 102. The ratio of PV devices to antenna elements may vary by row; at the outer rows, there may be more elements than PV, for the central rows there may be more PV than RF elements. Each PV element 118 of the solar array 116 outputs electrical power that is used to supply drive to the associated antenna element 102 of the array 100 to produce a beam of energy that is steered by the drive circuit 106 towards a fixed location.

Figure 13:
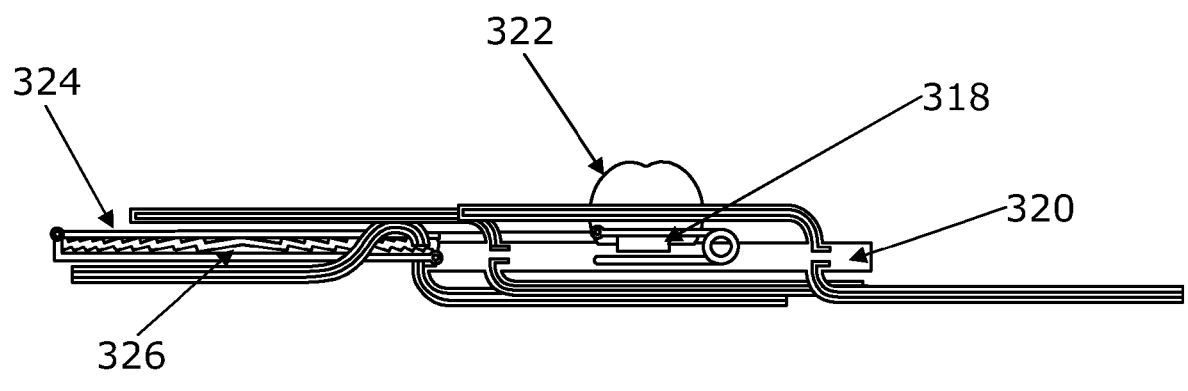
FIG. 13 is an example arrangement of a PV cell and dipoles, in a collapsed position.
Figure 14:
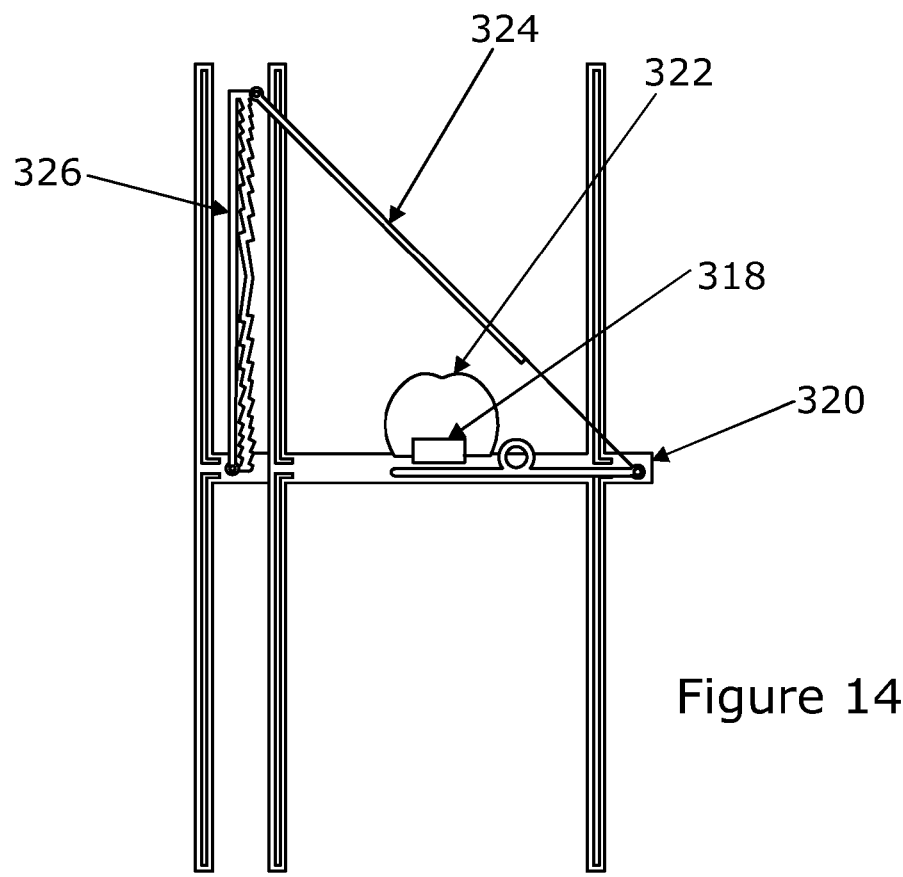
FIG. 14 is the example arrangement of FIG. 13, in an erect position.
Figure 15:
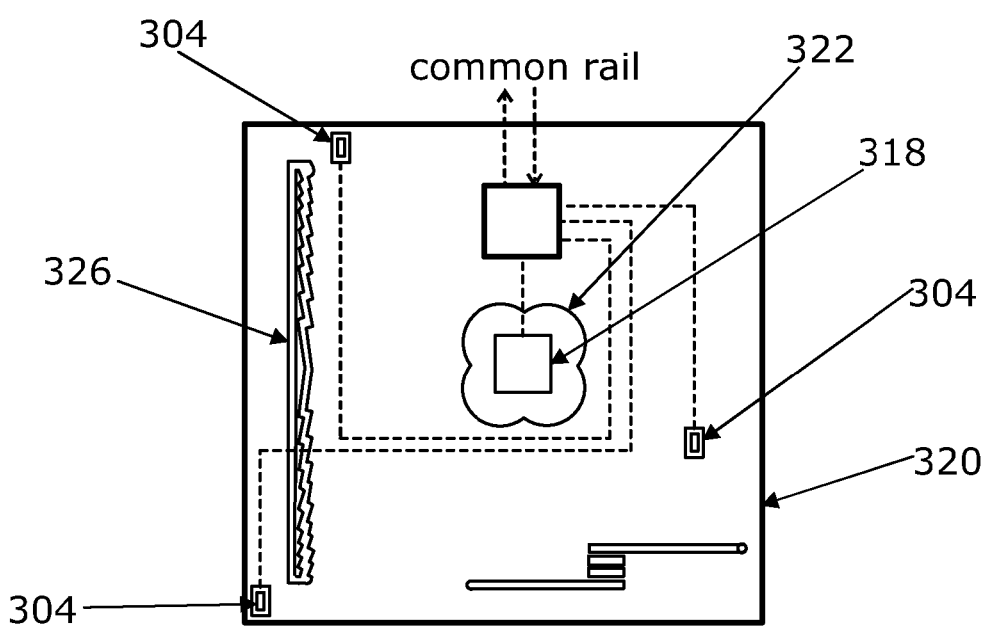
FIG. 15 is the example arrangement of FIG. 13, in plan view.

FIGS. 13 to 15 show a possible arrangement of PVs and elements. FIG. 13 shows the arrangement in a collapsed condition and FIG. 14 shows the arrangement in elevation, whilst FIG. 15 shows this in plan view.

As can be seen, the substrate 320 carries the PV element 318 which is covered by a Kohler concentrator 322. Above the concentrator 322 is a mirror 324, at 45 degrees to the plane of the substrate 320, and this receives sunlight from a Fresnel lens 326 that is arranged orthogonal to the substrate 320. The mirror 324 functions to bend the received sunlight that has been collected by the lens 326 through 90 degrees onto the PV element 318.

FIG. 15 shows the arrangement of the three dipoles 304 that make up an element of the array around the lens 326 and PV element 318.

The arrangement can be on a very small scale, with the Fresnel lens 326 perhaps around 13 mm square.

Considering the current state of the art for PV elements, multi-junction III/V PV elements have reached efficiencies of 47% at >300 suns. Using a 13 mm square Fresnel lens arranged such that from ONE particular azimuth angle (facing the Sun) they have the same aperture as the RF aperture (though RF aperture is unchanged over 360 degrees, of course), except for small area losses due to the thickness of the substrate and shadowing from any of the struts that support the array, the dielectric mirror reflects this concentrated sunlight down onto the Kohler concentrator, and onto a 4 junction PV chip measuring perhaps 1 mm square. For ideal optics, this gives 169 suns concentration.

The use of many hundreds of these small PV and antenna arrangements ensures the average power density at each substrate is low, allowing thermal control via simple low-mass conductive heat spreading. In contrast, solar concentration at large scales requires more complex thermal control. In a space environment this typically implies massive radiators and associated equipment for pumped fluids, with inherent reliability issues associated with bearing wear and micrometeorite damage.

Figure 16:
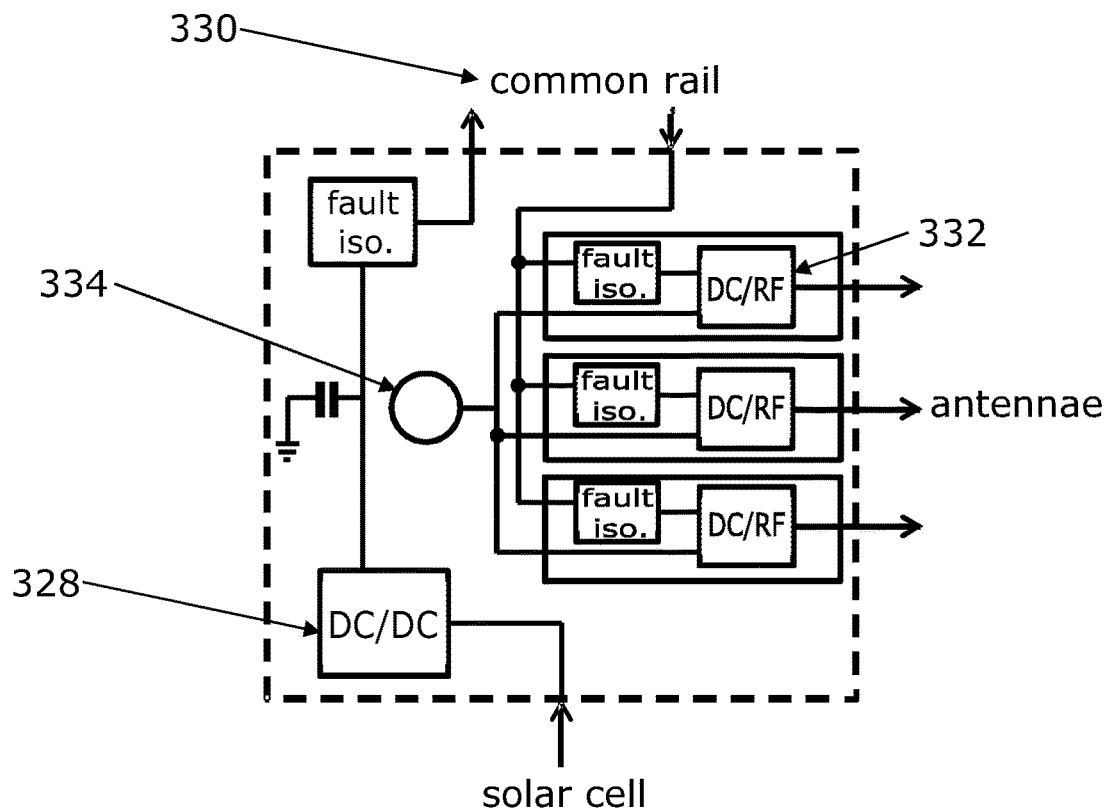
FIG. 16 is the circuitry of FIG. 13, shown in detail.

FIG. 16 is a schematic diagram showing how the PV elements 318 and antennae 302 across the array are connected together. The voltage output from each PV element 318 (or a combination of a small number of PV elements), is fed into a DC-DC converter 328 with feedback control of its input voltage for maximum PV I-V operating point efficiency. The output of the DC-DC converter 328 is then fed onto a common system-wide rail 330, segmented for fault isolation and power re-routing. This common rail 330 then supplies both DC-RF generation for all elements (segmented for fault isolation) and ancillary system control functions. The DC-RF circuitry 332 may comprise a local oscillator, phase-locked to a system-wide reference, a digitally-controlled phase offset select by the drive circuit, a digitally-controlled output supply rail, class-E RF drive output, and some antenna impedance matching.

To allow for some flex in the array, the system-wide reference may also be linked to a system-wide synchronised timing reference for relative phase determination for each element 302. This may comprise a plurality of detectors 334 dispersed amongst the array—each fixed relative to at least one element 302, which sample the phase of the spherical wavefront associated with a distant pilot beam source emanating from the target with receivers interspersed amongst the array. This pilot beam may be at a different frequency to the power beam. These phase samples are subsequently time-reversed before being applied as the relative phase for each element 302. Interpolation over short distances may be used to reduce the number of phase sampling receivers.

Figure 9:
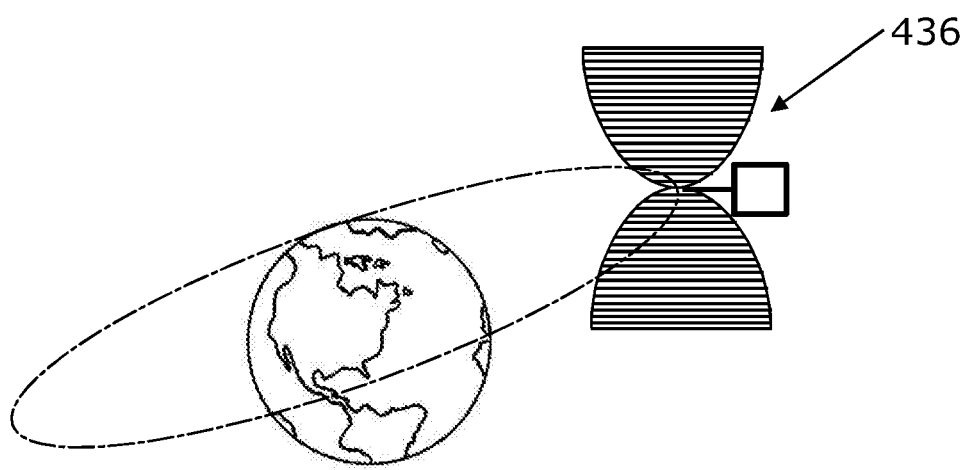
FIG. 9 is a representation of power beaming apparatus of FIG. 8 in the form of a satellite placed on orbit around the Earth.

FIG. 9 shows a possible arrangement of a satellite 436 that falls within the scope of a further aspect of the invention. The satellite 436 comprises a phased antenna array 100 and PV array 118 as shown in FIG. 8.

Figure 17:
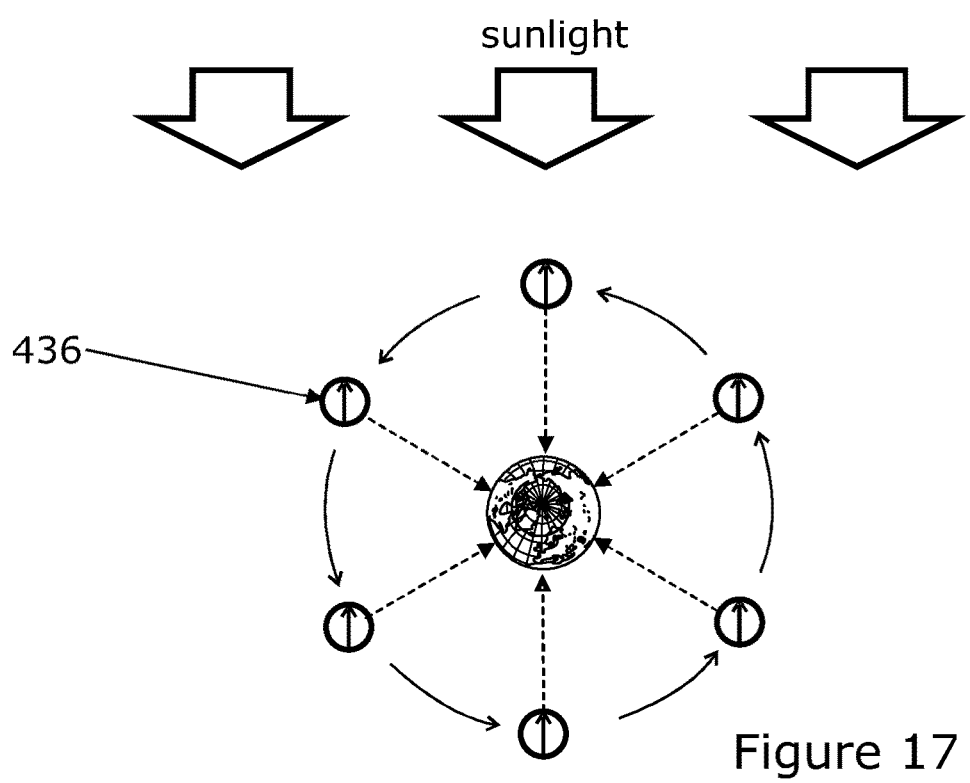
FIG. 17 is a depiction of the orientation of the power-beaming apparatus when in geostationary orbit around the Earth.

A key feature of the satellite 436, which is enabled by the ability of the array 100 to steer the beam through 360 degrees, is that the orientation of the solar photovoltaic cells relative to the respective antenna elements can be fixed, so there are no moving parts required. This enables the satellite 436 to be rotated about its axis to ensure the solar array is optimally facing the Sun at any given time, and yet the beam can always be steered to ensure the beam stays pointing to the same point on the Earth under the control of the drive circuit. The substantially constant aperture of the array, on the other hand, ensures that the power that can be transmitted remains fairly constant as the phased array rotates. FIG. 17 shows a suitable orbit for the satellite 436, with the arrow on each image of the satellite 436 showing the PV elements always face towards the Sun. The common Z axis of the array in this image goes into the plane of the page, and it can be seen that by steering through 360 degrees once per orbit around the Earth the beam can always be steered onto a target on the Earth's surface.

Figure 10:
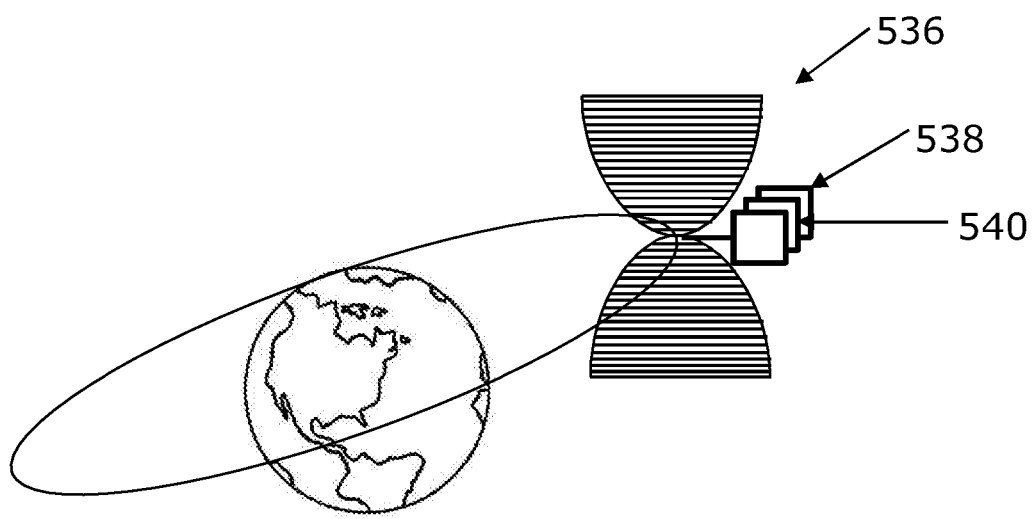
FIG. 10 is a representation of a similar satellite which may be used to relay information within a communications network.

The reader will of course appreciate that, in addition to or as an alternative to power beaming, the invention is suitable for producing a satellite 436 that can send a beam encoding information from space to a fixed location of the Earth. In a modification, shown in FIG. 10, the satellite 536 includes a modulator 538 which modulates the beam that is transmitted with information. A number of different modulation techniques may be used, all of which will be familiar to the person skilled in the art and as such will not be described here in any detail. The signal may, for instance, be modulated using one of the following non-exhaustive list of modulation processes: ASK (Amplitude Shift Keying, or amplitude modulation), FSK (Frequency Shift Keying, or frequency modulation) and PSK (Phase Shift Keying, or phase modulation).

The satellite includes a transponder 540 that receives a signal from the Earth or some other distant location that contains information, and converts this into a signal that modulates the beam transmitted by the phased array. The transponder 540 in this example detects incoming radio frequency signals encoding the information.

The reader will also appreciate that a combined solar array and phased array that can efficiently track the Sun can be used in many other applications beyond being put into an orbit around the Earth. In another application, the apparatus may be fixed to the ground, onto a moving vehicle or ship or other mobile platform, to send power through the atmosphere to a remote device.

Figure 11:
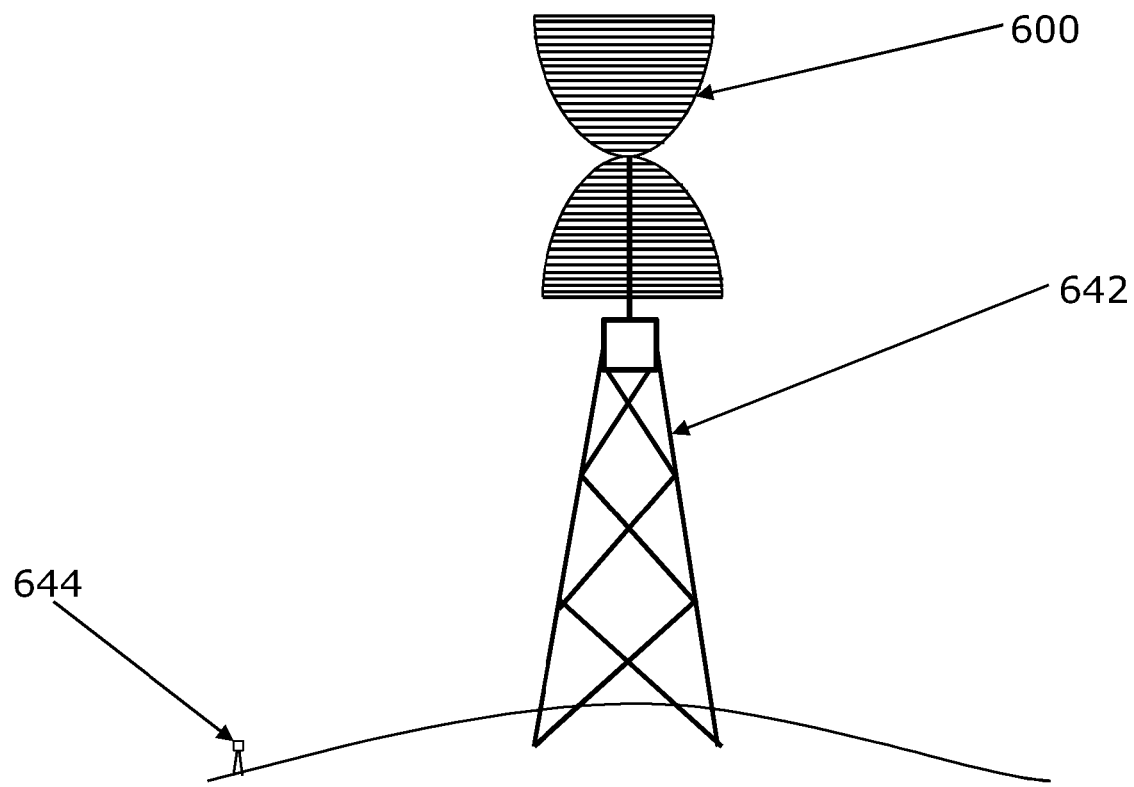
FIG. 11 is a representation of a power beaming apparatus incorporated on a rigid ground-based structure.

An arrangement where the array 600 is fixed to a rigid support platform 642 some kilometers from a target 644 is shown in FIG. 11. The antenna/rectenna diameters and wavelength determine the maximum beaming distance.

Figure 12:
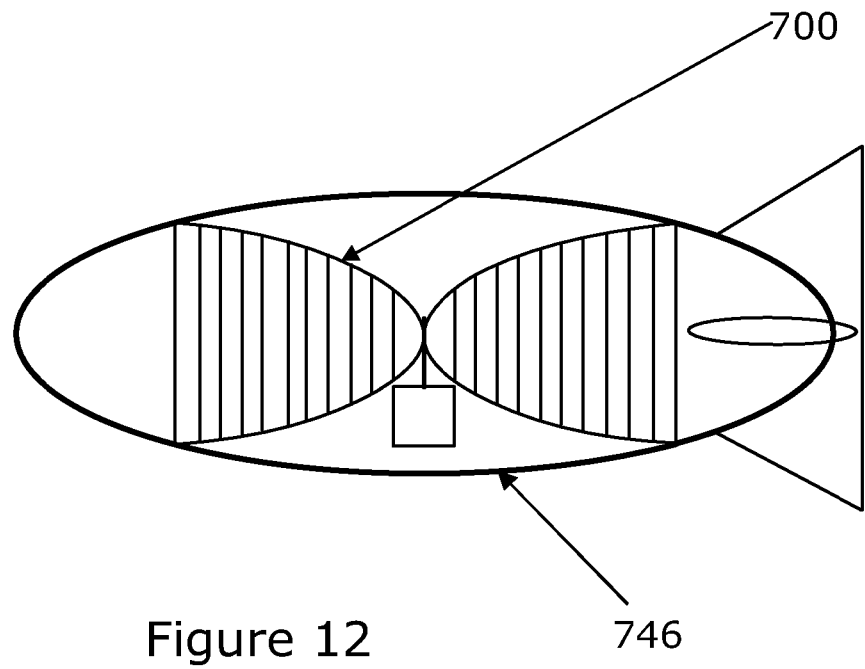
FIG. 12 is a representation of a power beaming apparatus incorporated within a dirigible airship.

In another embodiment, shown in FIG. 12, the phased array 700 may be fitted to an airplane or a lighter than air vehicle such as a large super-pressure balloon or airship 746. This is shown in FIG. 12 where the array 700 is located inside the airship 746.

Where fitted inside an airship the dirigible structure or blimp skin tension helps support the array.

The invention claimed is:

1. An electromagnetic phased array comprising a plurality of antenna elements, each antenna element comprising at least three constituent antennae; and
a drive circuit, such that a vector sum of constituent antenna currents when in use generates about an axis of each element a radiation pattern or pattern of sensitivity to received radiation that has a defined minima at or close to a null in at least one direction,
in which the drive circuit effects electronic steering of this minima of each respective pattern for each antenna element through a range of angles around the axis of each antenna element of the array by appropriate setting of the vector currents associated with its constituent antennae,
further in which the axes of each of the antenna elements are aligned in parallel with a central axis of the array and in which at least a sub-set of the elements lie substantially on a common helical surface which is defined by twisting a rectangular vertical plane along the central axis of the array, the elements being spaced along this plane such that the array has a substantially constant aperture.

2. The electromagnetic phased array according to claim 1, wherein the helical surface rotates through approximately 180 degrees, or a multiple of, from one end of the array to an opposing end, with elements being located along the surface from one end to the other.

3. The electromagnetic phased array according to claim 1, wherein all of the elements of the array lie on the common helical surface or in which the elements are arranged so that they all lie perfectly on the twisted helical plane.

4. The electromagnetic phased array according to claim 1, wherein the elements are arranged in multiple sets, each set containing a subset of the total number of elements, the elements of each set being arranged in a plane that is orthogonal to the axis of the array, optionally wherein the elements in each plane are arranged in a row, with the rows in adjacent planes being angularly offset so that the elements lie on the twisted helical surface, wherein each set contains the same number of elements or wherein the elements are arranged in a random or repeating or pseudo-random pattern on the helical surface which satisfies the $\lambda/2$ spacing constraint so that there are no grating lobes generated in use of the array.

5. The electromagnetic phased array according to claim 1: wherein each of the constituent antennae are substantially, or perfectly, omni-directional; or wherein each of the constituent antennae for an element comprise a dipole or a folded dipole, or other similar omni-directional antenna type, resonant at the centre wavelength, $\lambda$; or wherein each antenna element has an axis that is parallel to the axis of the array, and as such parallel to the axis of each antenna element; or wherein each of the elements of the array comprises a triangular arrangement of three parallel dipoles, spaced one-quarter wavelength apart from each other.

6. The electromagnetic phased array according to claim 1:
wherein the drive circuit is arranged to electronically steer the radiation pattern for each antenna element through a range up to a complete 360 degrees, either through a discrete set of angles or infinitely adjustable to any chosen angle within the range; or
wherein the drive circuit is configured to set the vector currents of the constituent antennae of each antenna element to provide the steerable null capability for the element; or
wherein the constituent antennae of each element are oriented spatially such that the drive circuit, by applying appropriate phase and magnitude currents for the antennae, produces a pattern for each element that has a steerable minima which may comprise a null being the extreme limit of the minima of the pattern; or
wherein the pattern of radiation, or pattern of sensitivity, for each element comprises a cardioid-shaped pattern or any suitable pattern that provides a steerable null.

7. The electromagnetic phased array according to claim 1, wherein the drive circuit is configured to drive the elements with appropriate phase to steer the beam, optionally wherein the drive circuit steers the beam through 360 degrees in azimuth and/or steers the beam in elevation by up to about ±55 degrees, with the peak intensity corresponding to the elevation pattern of its constituent antennae.

8. The electromagnetic phased array according to claim 1, wherein the phased array is configured to emit narrow-band radiation or receive narrow-band radiation, or be configured to do both at a wavelength, $\lambda$, in a range from sub-metre, >300 MHz, down to sub-centimetre, <300 GHz, parts of the electromagnetic spectrum, or at sub-millimetre scales.

9. The electromagnetic phased array according to claim 1, wherein the drive circuit comprises, for each element, a local oscillator that is phase-locked to a system-wide reference frequency source and a digitally-controlled phase offset that applies a phase offset to the output of the local oscillator, optionally wherein the drive circuit comprises a separate digitally-controlled phase offset for each antenna of each antenna element, further optionally wherein the drive circuit is configured to select a phase shift for each antenna according to the relative position of the antenna in the array to at least one other antenna in the array or relative to a fixed datum such as the common axis or which includes means for receiving or generating a system-wide synchronised timing reference and means for sampling the spherical wavefront of an incoming pilot beam.

10. The electromagnetic phased array according to claim 1, further comprising a signal-encoding circuit which modulates an RF source applied to one or more element, to encode a signal into the beam generated by the phased array, or wherein the spacing between adjacent elements is less than or equal to one half of the wavelength of the signal that is applied to or received by the elements.

11. The electromagnetic phased array according to claim 1, further comprising a substrate which provides mechanical mounting and electrical interconnection for the antennae of each element of the array, or wherein the drive circuit comprises an integrated circuit controlling n elements, where n is one or more.

12. The electromagnetic phased array according to claim 1, wherein the elements of the array are supported by a plurality of substrates, each substrate supporting at least one element, the substrates being connected by a network of linkages that define the relative positions of the substrates, optionally wherein the network of linkages include a plurality of joints that enable the array to be folded and unfolded, further optionally wherein each substrate lies in a horizontal plane orthogonal of the common axis of the array, the linkages connecting the substrates together.

13. The electromagnetic phased array according to claim 12, further including one or more of:
wherein the substrates and the elements they carry are joined to neighbouring (Z-offset) substrates by a multitude of struts and pivot joints, such that an action of folding in each local X-Y plane, results in a reduction in both angular and linear offset between adjacent sub-arrays about and along the Z axis—leading to a highly compact in 3 dimensions stowed form;
further comprising one or more spring at the hinge joints that connect a segment to another segment, the springs being arranged to apply a force to the segments when in the folded condition that will cause the structure to unfold automatically when released;
further comprising a releasable lock mechanism that when locked holds the structure in the folded position and when unlocked allows it to unfold.

14. A power beaming apparatus for harvesting solar energy from the Sun and transmitting energy to a remote location such as the Earth comprising:
a phased antenna array according to claim 1; and
an integrated solar array comprising a multitude of photovoltaic devices electrically connected to the phased antenna array, and their associated concentrating optics;
the solar array outputting electrical power that is used to supply the elements of the array to produce a beam of energy that is steered by the drive circuit towards the remote location.

15. The power beaming apparatus according to claim 14, wherein the integrated solar array and associated concentrating optics is physically dispersed throughout the phased antenna array, with each element or a subset of elements being located proximal one or more associated photovoltaic devices or wherein the remote location comprises a fixed point on the Earth, or a fixed point on a moving object such as a boat, or plane, or a satellite, or any point in space that can be tracked by the beaming apparatus to enable the drive circuit to steer the beam towards that location or wherein the number of elements in the array, the power transmitted by each element, and the amount of energy that may be collected from the Sun by the solar array, is chosen to enable a beam of sufficient power to be fed into the national electricity grid, or smaller off-grid facility such as a military forward base.

16. The power beaming apparatus according to claim 14, wherein the relative orientation of the solar array and the phased antenna array is fixed so no moving joints are needed between the solar array and phased antenna array.

17. The power beaming apparatus according to claim 14, wherein the positioning device includes a solar tracker that determines the orientation of the Sun relative to the power beaming apparatus and positions the solar array in a most optimal angle relative to the Sun to maximise the efficiency of the solar panel.

18. The power beaming apparatus according to claim 14, further including either non-imaging dielectric optics that concentrate sunlight through an angle of up to 90 degrees onto the photovoltaic devices of the array or a flexible line-focus dielectric parabolic reflector arranged in a Compound Parabolic Concentrator configuration.

19. The power beaming apparatus according to claim 14, wherein the power beaming apparatus comprises a part of a satellite that is, in use, suitable for placing on an orbit around the Earth or any other flight path in space, for instance an orbit around the Moon or another planet or further comprising a positioning device which controls the orientation of the solar array relative to the Sun, in particular to control the attitude of the power beaming apparatus in a space application.

20. An apparatus for beaming a signal encoding information comprising:
- a phased antenna array according to claim 1; and
- an integrated solar array comprising a multitude of photovoltaic devices electrically connected to the phased antenna array,
- the solar array outputting an electrical power signal that is used to supply drive the elements of the array to produce a beam of energy that is steered by the drive circuit towards the remote location,
- optionally further comprising a transponder that receives a signal from the Earth or some other distant location that contains information, and converts this into a signal that modulates an RF waveform that is applied to the elements of the phased array.

\* \* \* \* \*